US005707597A

United States Patent [19]
Andrianov et al.

[11] Patent Number: 5,707,597
[45] Date of Patent: Jan. 13, 1998

[54] POLYHALOPHOSPHAZENE SOLUTIONS STABLE AGAINST GELATION

[75] Inventors: Alexander K. Andrianov, Belmont, Mass.; Jonathan R. Sargent, Santa Monica, Calif.; Sameer S. Sule, Marlboro; Mark LeGolvan, West Roxbury, both of Mass.

[73] Assignee: Virus Research Institute, Inc., Cambridge, Mass.

[21] Appl. No.: 747,613

[22] Filed: Nov. 13, 1996

[51] Int. Cl.$^6$ .............................. C01B 25/10; C08L 85/02
[52] U.S. Cl. ........................... 423/265; 423/300; 524/372; 524/375
[58] Field of Search .................. 423/300, 265; 524/372, 375

[56] References Cited

U.S. PATENT DOCUMENTS

| | | |
|---|---|---|
| 4,080,432 | 3/1978 | Snyder et al. . |
| 4,374,815 | 2/1983 | Li ............................................. 423/300 |
| 4,623,525 | 11/1986 | Hergenrother et al. . |

FOREIGN PATENT DOCUMENTS 2697008  4/1994  France .

OTHER PUBLICATIONS

Inorganic Chemistry, vol. 6, No. 10, pp. 1709–1715 (Oct., 1966).
J. of Polymer Science, vol. 12, pp. 433–444 (1974).
Macromolecules, vol. 8, No. 1, pp. 36–42 (Jan.–Feb. 1975).
Liquid Chromatography of Polymers and Related Materials III, Hagnauer, et al., pp. 99–101 (1981).
Macromolecules, vol. 22, No. 1, pp. 75–79 (1989).

*Primary Examiner*—Wayne Langel
*Attorney, Agent, or Firm*—Elliot M. Olstein; Raymond J. Lillie

[57] ABSTRACT

A solution which comprises a polyphosphazene solute, such as a polyhalophosphazene solute, and a stabilizing solvent such as diglyme. Such solution enables the polyphosphazene to remain stable for extended periods of time so that such polyhalophosphazenes may be employed for further modification or use.

13 Claims, No Drawings

POLYHALOPHOSPHAZENE SOLUTIONS STABLE AGAINST GELATION

This invention relates to polyphosphazenes, and in particular to polyhalophosphazenes or polyorganohalophosphazenes, in solution. More particularly, this invention relates to polyhalophosphazenes or polyorganohalophosphazenes in solution in which the solution contains a solvent which stabilizes the polyhalophosphazenes or polyorganohalophosphazenes against gelation.

Polyhalophosphazenes, such as, for example, poly(dichlorophosphazene), or PDCP, are used as a starting material for the synthesis of many useful polyorganophosphazenes. In general, polyhalophosphazenes such as PDCP are synthesized by a polymerization of cyclic oligomers, such as, for example, hexachlorocyclotriphosphazene, or $(NPCl_2)_3$, either by a melt polymerization or a solution polymerization, with or without use of a catalyst. The polymer is then dissolved in a solvent, and is derivatized by substitution of the halogen group(s) with desired organic group(s) according to the following reaction scheme:

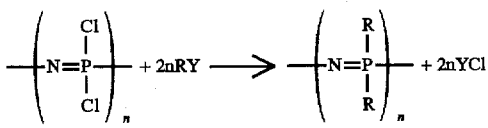

wherein R is alkoxy, aryloxy (including carboxylated aryloxy), arylamino, or alkylamino, and Y is an alkaline metal or hydrogen. In general, the solvent is miscible with the reagents. Solvents which may be employed include benzene, toluene, dioxane, and tetrahydofuran, or THF. (Singler, et al., *J. Polymer Sci.*, Polymer Chemistry, Edition 12, pg. 442 (1974); Allcock, et al., *Macromolecules*, Vol. 22, No. 1, pg. 78 (1989); Allcock, et al., Phosphonitrilic Compounds VI, *Inorganic Chemistry*, Vol. 6, pg. 1714 (1966)).

Polyhalophosphazenes such as PDCP, however, are hydrolyrically labile and require protection from moisture. Water causes crosslinking of the polymer, thereby causing the formation of an insoluble gel, which renders the polyhalophosphazene useless for further use. Crosslinking of PDCP has been reported when PDCP has been dissolved in solvents such as benzene, toluene, chlorobenzene, monoglyme (1,2-dimethoxyethane), tetrahydrofuran, cyclohexane, and acetone. (Allcock, et al., *Macromolecules*, Vol. 8, No. 1, pgs. 36–42 (January–February 1975); U.S. Pat. No. 4,623,525, Hergenrother, et. al., Nov. 18, 1986). In addition, in polar solvents such as acetone and dimethylformamide, polydichlorophosphazene hydrolyzes rapidly, and solutions of the polymer turn turbid. A white precipitate is evident within a few hours to several days. (Hagenauer, et al., "Polyphosphazene Polymerization Studies Using High Performance GPC," in *Liquid Chromatography of Polymers and Related Materials III*, Cazes, ed., Marcel Dekker, N.Y., pgs. 99–114 (1981).)

Crosslinking can occur in anhydrous solvents in a matter of days. Solutions of PDCP in dry benzene underwent a slow viscosity increase which culminated in gelation of the solution after six days at 25° C. Attempts to exclude water from the system did not retard the crosslinking process appreciably. (Allcock, et al., Phosphonitrilic Compounds VI, *Inorganic Chemistry*, Vol. 6, pg. 1714 (1966)).

There have been various attempts to prevent the crosslinking of the polyhalophosphazenes during storage by adding a substance that will inhibit crosslinking. For example, it has been shown that stannic chloride added to a PDCP solution, wherein the solvent is an organic solvent, can prevent or delay gelation. This substance is effective when added to PDCP in the amount of 0.6 mole percent of $SnCl_4$ per poly(dichlorophosphazene) repeating unit. (Allcock, et al., 1966). U.S. Pat. No. 4,623,525, issued to Hergenrother, et al., discloses that the stabilization of PDCP in organic solvents also can be achieved by using complexes of a chloro-substitute silicon, germanium, or titanium with tertiary amines. Examples of chloro-substituted, compounds are $SiCl_4$, $GeCl_4$, $SnCl_4$, and $TiCl_4$. Amines which may be employed include trimethylamine, triethylamine, tripropylamine, dimethylethylamine, pyridine, and N,N,N',N'-tetramethylethylene diamine. As disclosed in such patent, at least one mole of a chloro-substituted compound and at least one mole of a tertiary amine is added for each mole of water in the PDCP solution.

French Patent Application No. 2,697,008 discloses the addition of thionyl chloride to prevent crosslinking of PDCP in solution. In the disclosed method, 0.1 to 10% wt./vol. of $SOCl_2$ is added to solution of PDCP in an organic solvent, wherein the organic solvent is benzene, monochlorobenzene, dichlorobenzene, and trichlorobenzene.

Although the above methods permit stabilization of polyhalophosphazene in organic solvents, such methods also have disadvantages. The halogen-containing stabilizing compounds hereinabove described may react with nucleophiles commonly used as reagents in the process of converting PDCP into useful polyorganophosphazenes, thereby causing competing side reactions, contamination of the final product, and undesired chemical modification of PDCP. (Mark, et al., *Inorganic Polymers*, Prentice Hall, pg. 69 (1992); March, *Advanced Organic Chemistry, Reactions, Mechanisms, and Structure*, 3rd Edition, John Wiley & Sons, pgs. 287, 373, 981 (1985)).

U.S. Pat. No. 4,080,432 discloses the addition of an oxygen-containing organic compound to a mixture of polydichlorophosphazene and a hydrocarbon solvent. The oxygen-containing organic compound acts as a solubilizing diluent and is added in an amount of up to 10% by weight of the resulting mixture. Preferred oxygen-containing organic compounds are alcohols such as pentanol. Other oxygen-containing compounds which may be employed in the process diclosed in U.S. Pat. No. 4,080,432 include ketones, aldehydres, esters, ethers, polyethers, and mixtures thereof. Specific examples of such compounds are diglyme and tetrahydrofuran.

In accordance with an aspect of the present invention, there is provided a solution which comprises a solute and at least one solvent. The solute is a polyphosphazene. The at least one solvent includes a first solvent in an amount of at least 25% by volume of the total amount of solvent. The first solvent has the following structural formula:

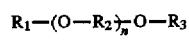

Each of $R_1$ and $R_3$ is an aliphatic or aromatic hydrocarbon having from 1 to 6 carbon atoms, and each of $R_1$ and $R_3$ may be the same or different. $R_2$ is an aliphatic hydrocarbon having from 1 to 4 carbon atoms. n is from 2 to 10, preferably from 2 to 4.

Preferably, the polyphosphazene is a polyhalophosphazene or a polyorganohalophosphazene. Polyhalophosphazenes which may be employed as the solute include, but are not limited to, polydichlorophosphazene and polydibromophosphazene. In one embodiment, the polyhalophosphazene is polydichlorophosphazene. Polyorganohalophosphazenes which may be employed as the solute include, but are not limited to, poly (phenoxychloro) phosphazene.

Although oxygen-containing compounds have been included in mixtures with hydrocarbon solvents and polyhalophosphazenes, it was believed that if such compounds were present in an amount greater than 10%, crosslinking of the polyhalophasphazene would occur.

Applicants have found surprisingly that one may form a solution of a polyphosphazene (such as a polyhalophosphazene or polyorganohalophosphazene) in at least one solvent which includes at least 25% by volume of the solvent having the structural formula hereinabove described, whereby the polyphosphazene is not crosslinked and remains stable against gelation.

In another embodiment, each of $R_1$ and $R_3$ is an alkyl group having from 1 to 4 carbon atoms, and each $R_1$ and $R_3$ may be the same or different. Preferably, each of $R_1$ and $R_3$ is methyl.

In a preferred embodiment, $R_2$ is ethylene (i.e., $C_2H_4$).

In another preferred embodiment, n is 2.

In a most preferred embodiment, the first solvent is diglyme, also known as bis-2-methoxyethyl ether or diethylene glycol dimethyl ether, which has the following structural formula:

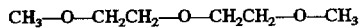

$CH_3-O-CH_2CH_2-O-CH_2CH_2-O-CH_3$

In another embodiment, the solution includes at least a second solvent. Examples of the second solvent include, but are not limited to, tetrahydrofuran, toluene, benzene, halobenzenes such as chlorobenzenes, monoglyme, dioxane, and mixtures thereof.

Preferably, the first solvent is present in an amount of at least 50% by volume of the total amount of the solvent, and more preferably, at least 75% by volume of the total amount of the solvent.

In another embodiment, the polyphosphazene is present in said solution at a concentration of from about 0.1% (wt./vol.) to about 30% (wt./vol.), and preferably from about 1% (wt./vol.) to about 10% (wt./vol.). More preferably, the polyphosphazene is present in an amount of about 8% (wt./vol. ).

In general, the solution is prepared by dissolving the polyphosphazene, such as, for example, a polyhalophosphazene such as PDCP, in the first solvent or in a mixture of the first solvent and one or more second solvents as hereinabove described. The resulting solution stabilizes the polyhalophosphazene against crosslinking. The first solvent, which is a stabilizing solvent, is compatible with any modification reactions, and therefore, no additional steps of polymer purification are required before further modification. Thus, the polyphosphazene remains stable and is suitable for further modification or use.

The invention now will be described with respect to the following examples; however, the scope of the present invention is not intended to be limited thereby.

EXAMPLE 1

Poly [di(chloro)phosphazene] (PDCP) was synthesized by melt polymerization of $(NPCl_2)_3$ (Allcock, et al., *Macromolecules*, Vol. 8, No. 1, pgs. 36–42 (1974)), dissolved in anhydrous tetrahydrofuran (THF) under anhydrous conditions. The concentration of the PDCP in THF was determined gravimetrically to be 2.1% (wt./vol.). The solution was stored in a tightly sealed bottle and left under nitrogen for one week. Gelation of the composition was observed after 7 days.

EXAMPLE 2

PDCP was synthesized as described in Example 1 and then dissolved in anhydrous diglyme under anhydrous conditions. The concentrations were found to be gravimetrically 1.70% (wt./vol.), 0.90% (wt./vol.), 0.85% (wt./vol.), 0.45% (wt./vol.), 0.40% (wt./vol.), and 0.15% (wt./vol.). Solutions of PDCP in THF also were prepared. The concentrations of these solutions, determined gravimetrically, were 1.70% (wt./vol.), 0.90% (wt./vol.), 0.85% (wt./vol.), 0.45% (wt./vol.), 0.40% (wt./vol.), and 0.15% (wt./vol.). All samples were kept sealed under nitrogen and checked daily to observe if the samples were crosslinked. As shown in Table I below, after 35 days, none of the diglyme solutions were crosslinked, while all of the samples in THF were crosslinked.

TABLE I

| Sample | Solvent | Concentration of polymer | Crosslinking after 30 days | Time to crosslinking | Form of crosslinking |
|---|---|---|---|---|---|
| 1 | THF | 1.70% | yes | 10 days | gelation |
| 2 | THF | 0.90% | yes | 11 days | gelation |
| 3 | THF | 0.85% | yes | 12 days | gelation |
| 4 | THF | 0.45% | yes | 27 days | phase separation |
| 5 | THF | 0.40% | yes | 27 days | phase separation |
| 6 | THF | 0.15% | yes | 27 days | phase separation |
| 7 | diglyme | 1.70% | no | N/A | N/A |
| 8 | diglyme | 0.90% | no | N/A | N/A |
| 9 | diglyme | 0.85% | no | N/A | N/A |
| 10 | diglyme | 0.45% | no | N/A | N/A |
| 11 | diglyme | 0.40% | no | N/A | N/A |
| 12 | diglyme | 0.15% | no | N/A | N/A |

For the crosslinked THF samples, at concentrations higher than 0.5%, the crosslinked sample formed an insoluble gel. At lower concentrations, a phase separation was observed.

EXAMPLE 3

PDCP was synthesized as described in Example 1 and then dissolved in anhydrous diglyme under anhydrous conditions. The concentration of the $(NPCl_2)_n$ in diglyme was determined gravimetrically to be 8% (wt./vol.). The solution was stored in a tightly sealed bottle and left in an anhydrous nitrogen glove box for five months. During this storage period, crosslinking was not observed.

EXAMPLE 4

PDCP was synthesized as described in Example 1 and then dissolved in a mixture of anhydrous diglyme and anhydrous THF under anhydrous conditions. The concentrations of all samples were found gravimetrically to be 1.58% (wt./vol.). Six samples were prepared in solvent ratios shown in Table II below. As shown in Table II, the addition of diglyme can retard significantly or eliminate crosslinking of PDCP.

TABLE II

| Sample | % (vol./vol.) of diglyme in solvent mixture | % (vol./vol.) of THF in solvent mixture | Crosslinking after 35 days | Time to crosslinking | Form of crosslinking |
| --- | --- | --- | --- | --- | --- |
| 1 | 100 | 0 | no | N/A | N/A |
| 2 | 75 | 25 | no | N/A | N/A |
| 3 | 50 | 50 | yes | 18 days | gelation |
| 4 | 25 | 75 | yes | 9 days | gelation |
| 5 | 10 | 90 | yes | 8 days | gelation |
| 6 | 0 | 100 | yes | 7 days | gelation |

EXAMPLE 5

200 ml of a PDCP (8% wt./vol.) solution in diglyme that was stored for two months was placed into a three-neck flask under anhydrous conditions. 217 g of sodium propyl paraben and 196 g of propyl paraben were dissolved in 870 ml of diglyme, and the solution was added to the PDCP solution. The mixture was refluxed under anhydrous conditions for two days, after which time 225 ml of 16N potassium hydroxide solution were added. The poly[di(carboxylatophenoxy) phosphazene], or PCPP was isolated by filtration. The structure was verified by $P^{31}$-NMR and $H^1$-NMR. The molecular weight was determined to be 1.1 kg/mole by multi-angle laser light scattering. The composition and $M_w$ of the synthesized polymer were identical to that of a polymer obtained as described in Allcock, et al., *Macromolecules,* Vol. 22, No. 1, pg. 78 (1989).

It is to be understood, however, that the scope of the present invention is not to be limited to the specific embodiments described above. The invention may be practiced other than as particularly described and still be within the scope of the accompanying claims.

What is claimed is:

1. A solution comprising (i) a solute, said solute being a polyphosphazene; and (ii) at least one solvent, wherein said at least one solvent includes a first solvent in an amount of at least 25% by volume of the total amount of solvent, said first solvent having the following structural formula:

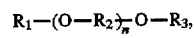

wherein each of $R_1$ and $R_3$ is an aliphatic or aromatic hydrocarbon having from 1 to 6 carbon atoms, and each of $R_1$ and $R_3$ is the same or different, $R_2$ is an aliphatic hydrocarbon having from 1 to 4 carbon atoms, and n is from 2 to 10.

2. The solution of claim 1 wherein said polyphosphazene is a polyhalophosphazene.

3. The solution of claim 2 wherein said polyhalophosphazene is poly(dichlorophosphazene).

4. The solution of claim 1 wherein each of $R_1$ and $R_3$ is methyl.

5. The solution of claim 1 wherein n is from 2 to 4.

6. The solution of claim 5 wherein $R_2$ is ethyl.

7. The solution of claim 6 wherein said first solvent is diglyme.

8. The solution of claim 1 wherein said at least one solvent further includes at least a second solvent selected from the group consisting of tetrahydrofuran, toluene, benzene, chlorobenzenes, monoglyme, and dioxane, and mixtures thereof.

9. The solution of claim 8 wherein said first solvent is present in an amount of at least 50% by volume of the total amount of solvent.

10. The solution of claim 9 wherein said first solvent is present in an amount of at least 75% by volume of the total amount of solvent.

11. The solution of claim 1 wherein said polyphosphazene is present in said solution at a concentration of from about 0.1% (wt./vol.) to about 30% (wt./vol.).

12. The solution of claim 11 wherein said polyphosphazene is present in said solution at a concentration of about 1% (wt./vol.) to about 10% (wt./vol.).

13. The solution of claim 12 wherein said polyphosphazene is present in said solution in an amount of about 8% (wt./vol.).

* * * * *